United States Patent [19]

Steger

[11] Patent Number: 5,594,226

[45] Date of Patent: Jan. 14, 1997

[54] AUTOMATED CHECK VERIFICATION AND TRACKING SYSTEM USING BAR CODE INFORMATION

[76] Inventor: Paul Steger, 2624 E. Shorewood Blvd., Shorewood, Wis. 53211

[21] Appl. No.: 523,646

[22] Filed: Sep. 5, 1995

Related U.S. Application Data

[63] Continuation of Ser. No. 273,372, Jul. 11, 1994, abandoned.
[51] Int. Cl.⁶ ................................................. G06F 17/60
[52] U.S. Cl. .......................... 235/379; 235/375; 235/487; 283/58
[58] Field of Search ........................... 235/379, 487, 235/375; 283/58

[56] References Cited

U.S. PATENT DOCUMENTS

| | | | |
|---|---|---|---|
| 4,346,442 | 8/1982 | Musmanno | 364/408 |
| 4,562,340 | 12/1985 | Tateisi et al. | 235/379 |
| 4,630,844 | 12/1986 | Troy et al. | 283/67 |
| 4,672,377 | 6/1987 | Murphy et al. | 235/375 X |
| 4,727,243 | 2/1988 | Savar | 235/379 |
| 4,948,174 | 8/1990 | Thomson et al. | 283/58 |
| 5,044,668 | 9/1991 | Wright | 283/58 |
| 5,175,682 | 12/1992 | Higashiyama et al. | 235/379 X |
| 5,187,351 | 2/1993 | Clary | 235/379 |
| 5,198,975 | 3/1993 | Baker et al. | 235/379 X |

FOREIGN PATENT DOCUMENTS 1199292  8/1989  Japan .

*Primary Examiner*—Donald T. Hajec
*Assistant Examiner*—Michael G. Lee
*Attorney, Agent, or Firm*—Young and Basile

[57] ABSTRACT

The present invention provides an apparatus for automatically accessing and verifying checking account status based on information contained in a bar code printed on a check, travelers check or money order. A bar code scanner reads the information contained in the bar code and, based on that information, determines a bank code and an account code. Based on the bank code or account code, a proper bank, travelers check company or money order company is automatically contacted. Checking, travelers check or money order account information is then transmitted to the proper bank, travelers check company or money order company. Account status information is received from the bank, travelers check company or money order company and displayed on the merchant's terminal. Finally, a receipt is printed with a bar code matching information on the check, travelers check or money order.

12 Claims, 4 Drawing Sheets

5,594,226

AUTOMATED CHECK VERIFICATION AND TRACKING SYSTEM USING BAR CODE INFORMATION

This application is a continuation of application Ser. No. 08/273,372 filed on Jul. 11, 1994, now abandoned.

FIELD OF THE INVENTION

The present invention relates to a verification system for negotiable instruments such as checks and more particularly to a system for automatically accessing and verifying the validity of the instrument based on information contained in a bar code printed on the face of the instrument.

BACKGROUND OF THE INVENTION

Payment by check, travelers check or money order is a popular method of payment in retail sales. The use of a check rather than cash or credit card is convenient for the customer and provides security by allowing the customer to carry less cash. Accepting regular checks, travelers checks or money orders as a form of payment is advantageous to merchants because of customer's desires to pay in this fashion. However, it is important for merchants to verify a check or travelers check before acceptance to reduce loss due to forgeries, bad checks, returned checks, and lost or stolen travelers checks.

Existing check verification systems use a Magnetic Ink Character Recognition (MICR) reader located at the point of sale terminal, reading a MICR code printed on the check. Such systems are not usable at all with travelers checks or money orders. Generally, when used, these MICR readers have no other use than to read magnetic characters from a check. A business owner may desire such a check verification system but may not want to invest in a MICR reader which is used exclusively for check verification.

Some existing check verification systems require substantial interaction by the merchant such as entering the amount of the sale, the check number, the bank code, and other data. These manual operations by the merchant delay completion of the sale and cause other customers in a check-out line to wait longer. Therefore, it is important for a check verification system to function quickly and require a minimal amount of interaction by the merchant, additionally giving the merchant a sense of security that he will receive the funds due to him by accepting the check, travelers check or money order.

SUMMARY OF THE INVENTION

The present invention provides an apparatus for accessing and verifying the status of an account or the like which lies behind a negotiable instrument such as a check, travelers check or money order which solves the problems discussed above. The inventive check verification system minimizes the interaction time required by permitting the merchant to validate an instrument by way of a real time, highly automated process which can increase transaction security and quickly identify lost or stolen checks, including travelers checks and money orders. By minimizing merchant interaction time, a faster check verification system results. The invention also provides a system for easily coordinating the check used in making the purchase with a receipt used to confirm the purchase.

This apparatus is particularly useful to retail merchants who must verify a customer's checking account status at the point of sale (such as a retail store or a bank branch) or a merchant who wants to verify the status of a travelers check or money order. Checks, travelers checks or money orders tendered by the customer in accordance with the invention include a bar code printed on the check. The bar code may be of various types including, but not limited to, Universal Product Code (UPC), EAN, JAN or UPC code 128. This bar code contains information regarding the bank code (ABA Routing/Transit Number) or Primary Access Number (PAN) as used in a bank debit card, account number and check number for checks, travelers checks or money orders. The bar code may also include an encrypted security number. Since all necessary account information is contained in the bar code, no MICR reader is required. Also, since the bar code may be read by an existing bar code scanner (e.g. NCR 7880 or NCR 7835), the merchant may not need to purchase and install additional scanning equipment. Additionally, some point of sale equipment or systems allow the bar code to be reprinted on the customer's receipt. Using the bar code printed on the receipt in conjunction with the bar code on the check provides the retailer with proof that the particular check used for the purchase of the merchandise is returned.

Retail merchants use a terminal at the point of sale which is capable of reading the bar code on the check. Based on the information read from the bar code, a software routine on the merchant's terminal determines the bank code or PAN, checking account number and check number or in the case of travelers checks or money orders, the status of the travelers check or money order. A customer Personal Identification Number (PIN) may be used at the point of sale to protect against unauthorized checking account use. The use of an encrypted security number in the bar code provides an additional level of protection. Bar code information printed on the consumer's drivers license may also be used for identification, easing the scanning and incorporation into identification of the check writer. The drivers license bar code may also be printed on the customer's purchase receipt. Using electronic communication equipment such as a modem, the terminal automatically calls a financial institution or financial institution co-op "switch" of a third party check authorization company, travelers check company, money order company or debit card system. If, for example, the retailer calls a financial institution switch, its computer determines the proper financial institution based on the bank code or PAN and automatically routes the transaction for approval to the customer's financial institution in an on-line, real time basis. If a PIN, encrypted security number or drivers license bar code are used, they may also be included in the transaction data transmitted.

A software routine transmits account information to the financial institution, travelers check company or money order company and receives account status information from the financial institution, travelers check company or money order company. A display screen on the terminal located at the merchant's point of sale displays the account status information received from the financial institution, travelers check company or money order company. Based on the information displayed, the retail merchant decides whether or not to accept the check, travelers check or money order, and if so, prints the receipt which then may contain the bar code from the check, travelers check or money order as well as the drivers license bar code.

Thus, the present invention provides a real time, on-line automated check verification system which requires a minimal amount of interaction by the merchant thereby resulting in a faster response to the verification inquiry and an additional proof that the check, travelers check or money order was used, with the bar code and all necessary data from the check, travelers check or money order printed on the receipt. This faster response allows a customer's transaction to be completed in a shorter amount of time and allows more customers to be served in a given period of time and more customer satisfaction when making a return of goods or services purchased. Furthermore, the account information obtained may be saved and used with a program run at the end of the day for automatic submission of checks to the bank, travelers check company or money order company, for clearing and settlement. For travelers checks or money orders, an accounting system in a preferred embodiment accounts for where and when a check was cashed in addition to verifying its authenticity and cashability. This helps travelers check companies and money order companies in high volume locations as well as where attempts are made to cash lost or stolen travelers checks or money orders. Travelers check companies or money order companies may also identify merchants that are cashing or accepting lost or stolen travelers checks or money orders.

DETAILED DESCRIPTION OF THE PREFERRED EMBODIMENT

Figure 1:
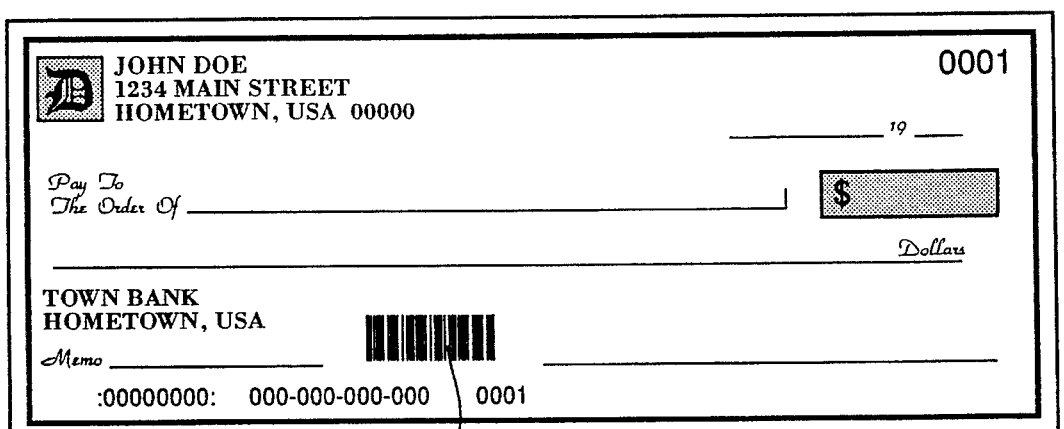
FIG. 1 illustrates a personal check containing a bar code as used with the present invention.
Figure 1A:
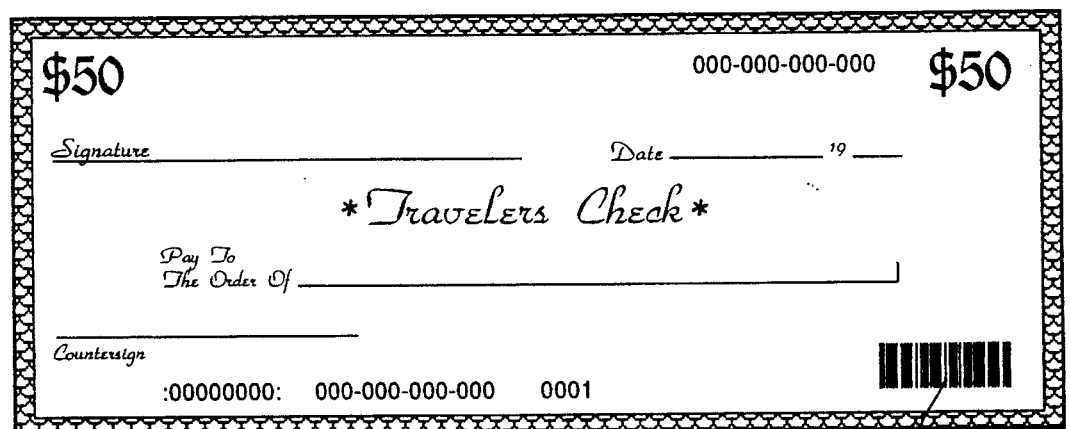
FIG. 1A illustrates a travelers check containing a bar code as used with the present invention.
Figure 6:
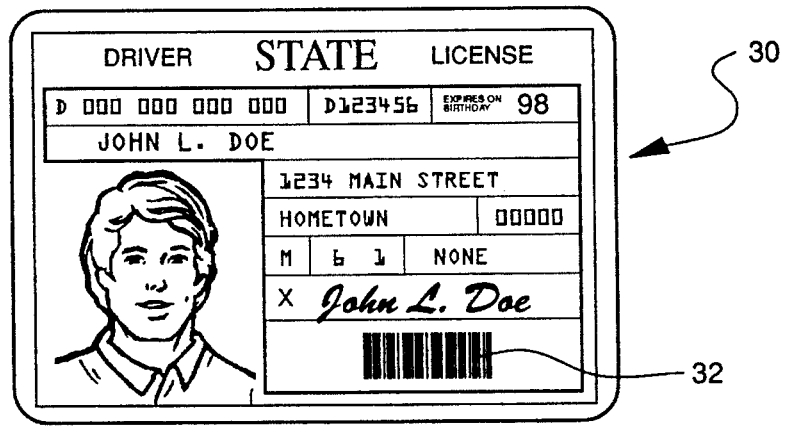
FIG. 6 illustrates a driver's license containing a bar code as used with the present invention.

Referring to FIG. 1 or 1A, a standard personal check 10 or travelers check 10A is shown with a bar code 12 printed on the face of the check. Bar code 12 is located in the space between the signature line and the memo line of check 10 or travelers check 10A. However, bar code 12 may be located elsewhere on check 10, e.g. in the lower right corner of the check, to the left of the date line, or on the back of the check. Further, the size and number of bar codes printed on the check may vary depending on the appearance and level of security desired. Also, it is not necessary that bar code 12 be printed directly onto check 10 or travelers check 10A. Instead, bar code 12 may be printed on an adhesive sticker and applied to one of several locations on check 10 or travelers check 10A. This sticker allows an existing supply of checks without a bar code to be used with this invention. Also, checks purchased from companies which cannot print bar codes may still be used with this system. Throughout this specification, any reference to bar code 12 printed on check 10 or travelers check 10A shall be understood to include bar code 12 printed on an adhesive sticker which is applied to check 10 or travelers check 10A. Further, any reference to bar code 12 printed on check 10 or travelers check 10A shall be understood to include different sizes and numbers of bar codes.

Although not shown in FIG. 1 or 1A, the present invention may be used with a money order or other negotiable instrument. Furthermore, any reference to check 10 or travelers check 10A shall be understood to apply as well to money orders and other negotiable instruments.

Although FIG. 1 illustrates a standard personal check, the present invention functions equally well with business or corporate checks, travelers checks, money orders and other negotiable instruments. Therefore, it will be understood that the invention described is not limited to the use of personal checks. Any reference to a check shall include money orders, travelers checks and other negotiable instruments.

Bar code 12 contains information regarding customer bank code (ABA Routing/Transit Number), Primary Access Number (PAN) as in a common debit card system, checking account number and check number or proper travelers check account information. Bar code 12 is a standard bar code (e.g., UPC, EAN, JAN, or UPC 128) which is readable by a variety of bar code reading devices (such as NCR 7880 or NCR 7835).

The customer may be required to enter a Personal Identification Number (PIN) when the bar code is scanned. The PIN is an additional level of security for both the customer and the merchant. An encrypted security code may be used to indicate the required use of a PIN. The PIN protects the customer by preventing anyone without the PIN from writing checks against the account. The merchant is protected by not accepting checks from parties who do not know the PIN and presumably should not have access to the checking account. In the case of driver's license bar code, the license-printed code is scanned and used in conjunction with the check or travelers check presented.

Figure 2:
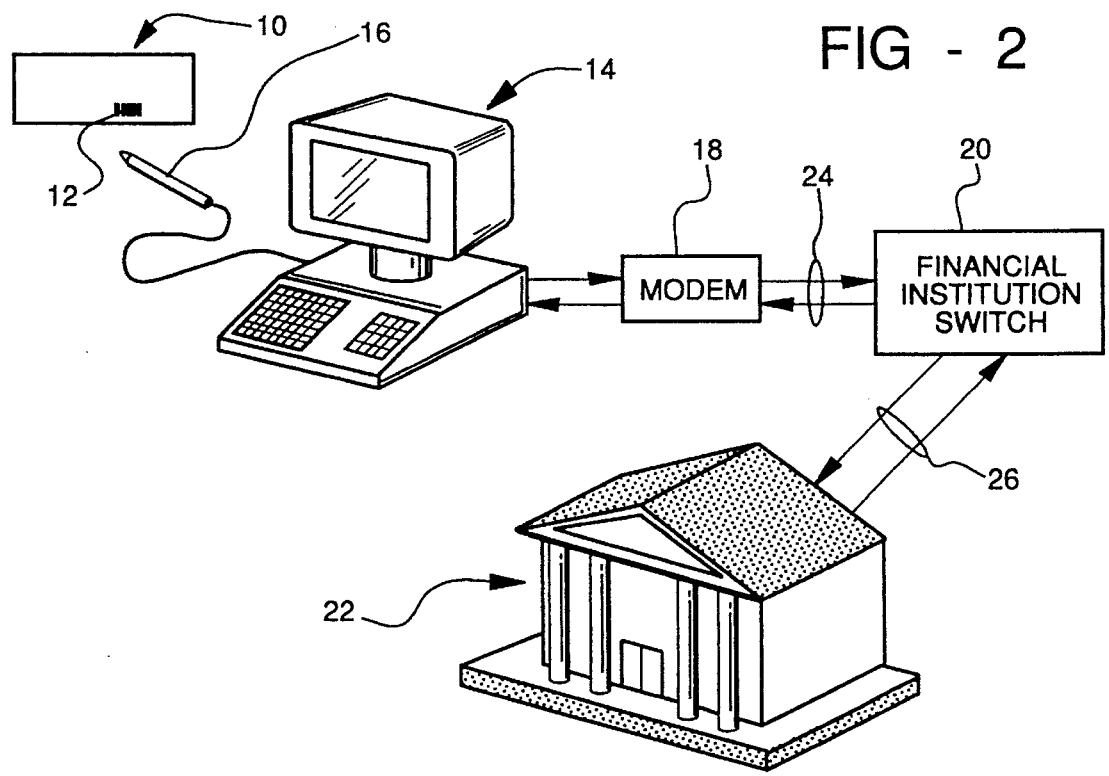
FIG. 2 illustrates the interactions between various components of the system.

Referring to FIG. 2, a laser scanner 16 is used to read bar code 12 on check 10. Laser scanner 16 is connected to a merchant's terminal 14. Laser scanner 16 is scanned across bar code 12 to read the bar code. The laser scanner 16 may be a hand-held wand reader. Alternatively, laser scanner 16 may be an existing stationary bar code scanner capable of reading bar code 12. The existing bar code scanner may be a hand-held device or a permanently mounted scanner. In this situation, the merchant is saved the expense of purchasing and installing additional scanning devices.

A software routine on terminal 14 determines the bank code or PAN, customer account number, check number and security information based on the information read from bar code 12 and like information for the travelers checks. Terminal 14 is electronically connected to a modem 18. A software routine on terminal 14 allows the terminal to communicate with modem 18. The software routine controls the operation of modem 18 as well as the flow of data to and from the modem.

In an alternate embodiment, terminal 14 is electronically connected to modem 18 through a network. Various types of networks may be used, as will be apparent to those skilled in the networking art.

A data link 24 connects modem 18 to a financial institution switch 20. Switch 20 is capable of switching an electronic transaction from one computer to another. Data link 24 allows bidirectional transfers of data between modem 18 and switch 20. Switch 20 receives bank code information from terminal 14 through modem 18. Based on the bank code received, switch 20 automatically connects terminal 14 to a proper financial institution 22. This connection is made using data link 26. Data link 26 allows bidirectional transfers of data between switch 20 and financial institution 22. Data links 24 and 26 may be conventional telephone lines or dedicated data transmission lines.

Figure 3:
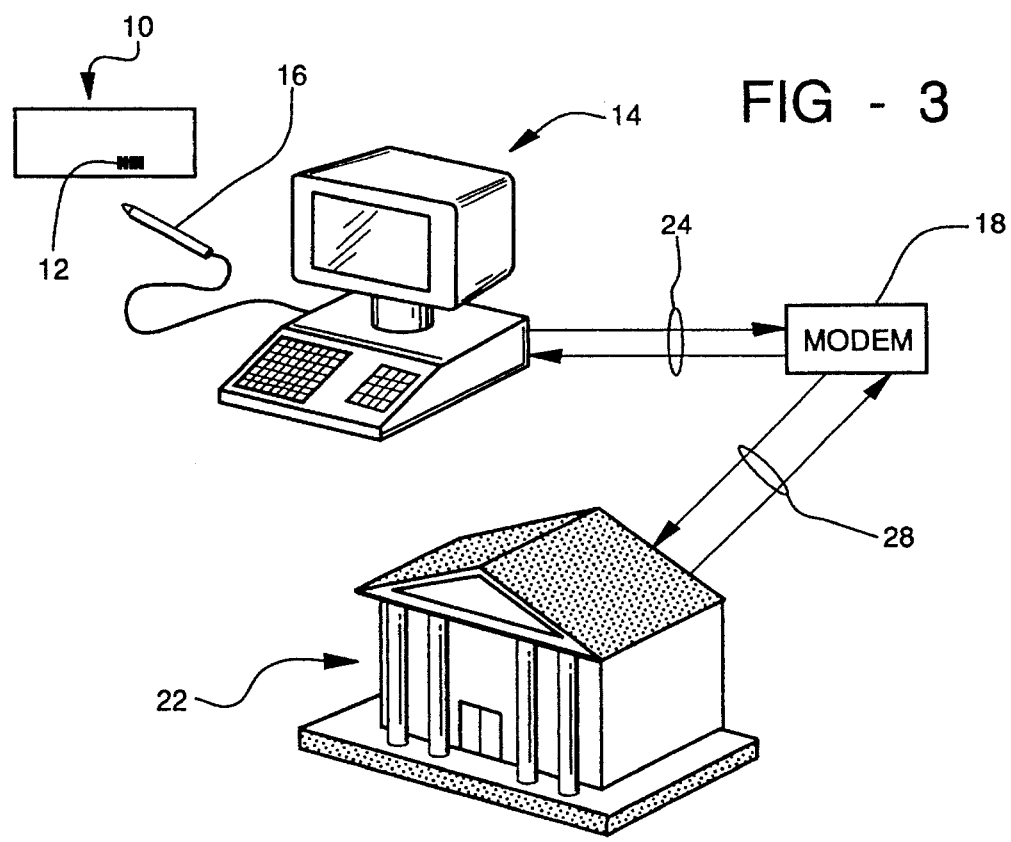
FIG. 3 is an alternate embodiment of the system shown in FIG. 2.

FIG. 3 illustrates an alternate embodiment of the system shown in FIG. 2 which does not require a financial institution switch and additionally may be used by a travelers check company. In this embodiment, modem 18 is connected directly to financial institution or travelers check company 22 using a data link 28. Data link 28 allows bidirectional transfers of data between modem 18 and financial institution 22. Data link 28 may be a conventional telephone line or a dedicated data transmission line. A software routine on terminal 14 uses a look-up table to determine how to contact the proper financial institution or travelers check company 22. The look-up table contains bank codes and or travelers check company codes and the corresponding contact information for each bank or travelers check company. The contact information includes the data necessary to connect with and communicate with the financial institution or travelers check company 22.

The functions performed by the present invention occur in real time. Real time is defined as the waiting time of a customer at the point of sale. This waiting time may vary depending on the type of transaction involved. In a complex financial transaction, the customer waiting time may be considerably longer than with a simple transaction. In complex transactions, the customer waiting time may exceed one hour.

Figure 4:
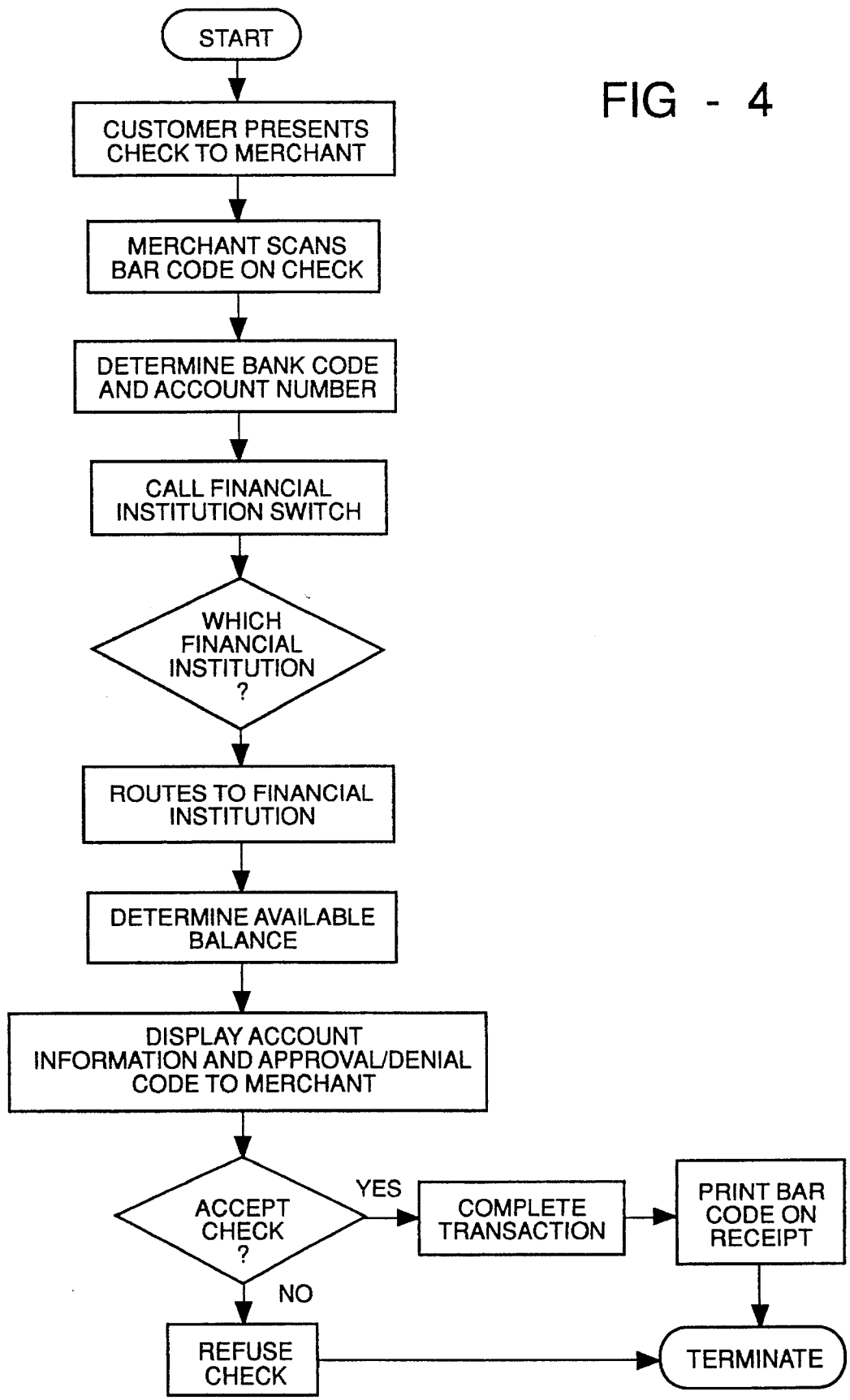
FIG. 4 illustrates a flow chart which describes the operation of the system in FIG. 2.
Figure 5:
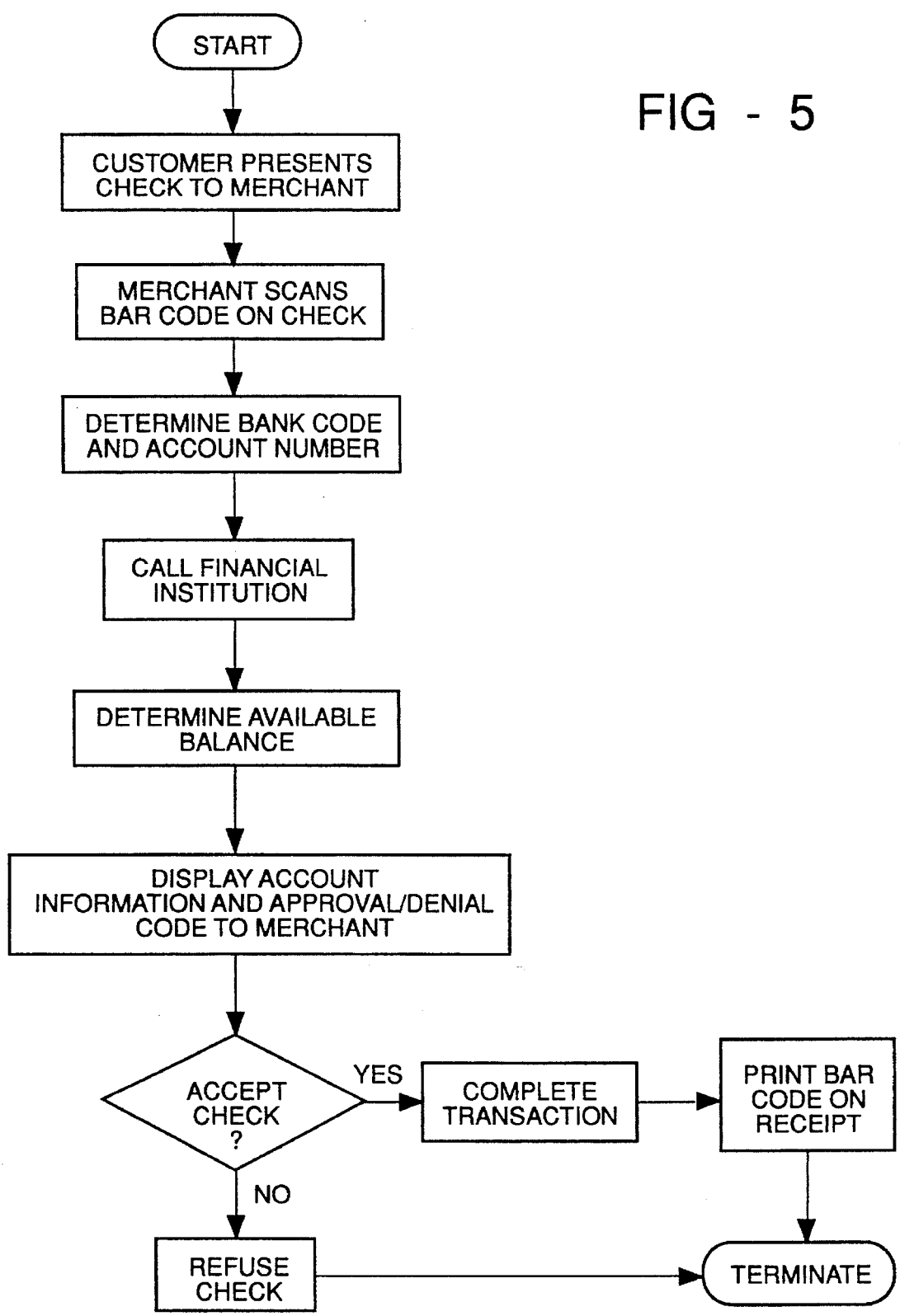
FIG. 5 illustrates a flow chart which describes the operation of the system in FIG. 3.

FIG. 4 illustrates a flow chart which describes the operation of the system in FIG. 2. FIG. 3 would use a sub-set of this flow (shown in FIG. 5) based on whether the call is to the financial institution or travelers check company. FIGS. 4 and 5 illustrate the operation of the system when a check is presented to a merchant. Similar operations occur when a travelers check, money order, or other negotiable instrument is used.

Initially, a customer presents check 10 or travelers check 10A to the merchant. The merchant scans bar code 12 using laser scanner 16 which is connected to merchant terminal 14. A software routine on terminal 14 determines the bank code or PAN, account number, check number and security information from the information contained in bar code 12 and like information for the travelers checks. Further, bar code data from the drivers license may be scanned when available.

Next, terminal 14 contacts financial institution switch 20 through modem 18 and data link 24. Switch 20 determines which financial institution to call based on the account number or PAN determined from bar code 12. Switch 20 then calls the proper financial institution 22, allowing terminal 14 to transmit the account number or PAN and transaction information to the financial institution or travelers check company.

Based on the information received, financial institution or travelers check company 22 verifies the checking account status and account balance information or the validity of the travelers check. If a PIN is used, financial institution or travelers check company 22 also determines whether a valid PIN was entered. If a driver's license is used the financial institution, travelers check issuer or third party determines the validity of the driver's license in association with the personal check or travelers check. This may also be accomplished by real time linking of each state drivers license database computer to the financial institution or travelers check company. This account information is then transmitted from financial institution or travelers check company 22 to terminal 14 through switch 20 and modem 18. The account information received is displayed on terminal 14 for viewing by the merchant.

The merchant may then decide whether or not to accept the check 10 or travelers check 10A. If the merchant decides to accept the check, the sale is completed and a receipt is printed with the bar code from the check or travelers check printed on the customer's receipt. Additionally, the drivers license bar code can be printed on the receipt. If the merchant decides not to accept the check, the sale may be canceled or the customer may offer another form of payment. If the check or traveler's check is lost or stolen, the merchant may be instructed to contact the financial institution or travelers check company.

In one embodiment of this invention, the availability of funds in the customer's checking account is not affected by the verification process. However, the invention may also be practiced by reducing the availability of funds in the customer's checking account by the amount of the sale. If a travelers check, it can be identified as lost or stolen, or simply tracked to the cashing merchant to determine how fast traveler's checks were used or simply for marketing or accounting information. If a lost or stolen travelers check, the travelers check company may determine if the merchant is defrauding the company by accepting lost or stolen traveler's checks.

The account information read from the bar code and received from the financial institution or travelers check company may be saved and used with a program run at the end of the day for submission of the checks to the bank or travelers check company for payment and clearing. The use of previously saved account information reduces the time required to process checks at the end of the day for the merchant. Other details of the transaction such as item purchased, quantity and cost can be saved to produce marketing reports in the future.

Although a particular embodiment of the invention has been described in detail for illustrative purposes, it will be understood that variations or modifications of the disclosed apparatus lie within the scope of the present invention.

What is claimed is:

1. An apparatus for automatically accessing and verifying with an underwriting institution the status of an account underlying a negotiable instrument and the authority of a purchaser to issue said negotiable instrument against said account when said negotiable instrument is presented to a merchant based on account information and security information contained in a bar code printed on the instrument for establishing that the purchaser is recognized by the underwriting institution as an authorized issuer of said negotiable instrument against said account, comprising:

a terminal for use by the merchant at a point of sale;

a bar code scanner electrically coupled to said terminal for reading the bar code printed on the negotiable instrument;

means for automatically determining an underwriting institution code and an account number from the bar code, said means for determining located in said terminal;

means for automatically deriving a personal identification number from the security information contained in the bar code, said means located in said terminal;

a modem electrically coupled to said terminal transmitting and receiving electrical communication therewith;

a bi-directional underwriting institution switch electrically coupled to said modem and capable of automatically establishing electrical communication with the underwriting institution based on the underwriting institution code contained in the bar code;

a display screen attached to said terminal for displaying transaction information to the merchant; and means for printing a receipt including a reproduction of the bar code contained on the negotiable instrument, said receipt capable of coordinating said negotiable instrument presented to the merchant with said receipt.

2. The apparatus of claim 1 further including means for saving account information and security information contained in said bar code for use in future processing of the transaction.

3. The apparatus of claim 1 wherein said bar code scanner is capable of reading a bar code printed on a drivers license, and said means for printing is capable of printing a reproduction of the drivers license bar code on a receipt for correlating said negotiable instrument presented to the merchant and said drivers license bar code with said receipt.

4. The apparatus of claim 1 further including means for automatically determining an encrypted security code from the bar code.

5. A method for automatically accessing and verifying with an underwriting institution the status of an account underlying a negotiable instrument and the authority of a purchaser to issue said negotiable instrument against said account when said negotiable instrument is presented to a merchant based on account information and security information contained in a bar code printed on the instrument for establishing that the purchaser is recognized by the underwriting institution against said account, comprising the steps of:

a) reading the bar code printed on the negotiable instrument;

b) deriving an underwriting institution code from the bar code;

c) deriving an account number from the bar code;

d) deriving a personal identification number from the bar code;

e) automatically contacting the appropriate underwriting institution based on the underwriting institution code contained in the bar code;

f) transmitting the account number and personal identification number to the appropriate underwriting institution;

g) receiving account status information from the underwriting institution;

h) displaying the account status information; and i) printing a receipt including a reproduction of the bar code contained on the negotiable instrument, said receipt capable of coordinating said negotiable instrument presented to the merchant with said receipt.

6. The method of claim 5 wherein step (e) comprises a software routine using a look-up table containing underwriting institution codes and corresponding underwriting institution contact information for automatically establishing communication with the appropriate underwriting institution.

7. The method of claim 6 wherein step (e) comprises a financial institution switch which automatically and in real time contacts the proper underwriting institution based on the underwriting institution code.

8. The method of claim 5 further including the step of saving the account information and security information contained in said bar code for use in future processing of the transaction.

9. The method of claim 5 further including the steps of reading bar code information from a drivers license and printing a reproduction of the drivers license bar code on the receipt for correlating said negotiable instrument presented to the merchant and said drivers license bar code with said receipt.

10. The method of claim 5 further including the steps of reading bar code information from a drivers license, automatically determining drivers license information from the drivers license bar code, and automatically verifying the drivers license information.

11. The method of claim 5 further including the step of automatically determining an encrypted security code from the bar code.

12. A method for automatically accessing and verifying with an underwriting institution the status of an account underlying a negotiable instrument and the authority of a purchaser to issue said negotiable instrument against said account when said negotiable instrument is presented to a merchant based on account information and security information contained in a bar code printed on the instrument for establishing that the purchaser is recognized by the underwriting institution as an authorized issuer of said negotiable instrument against said account, comprising the steps of:

a) reading the bar code printed on the negotiable instrument;

b) deriving an underwriting institution code from the bar code;

c) deriving an account number from the bar code;

d) deriving an encrypted security code from the bar code;

e) automatically contacting the appropriate underwriting institution based on the underwriting institution code contained in the bar code;

f) transmitting the account number and personal identification number to the appropriate underwriting institution;

g) receiving account status information from the underwriting institution;

h) displaying the account status information; and i) printing a receipt including a reproduction of the bar code contained on the negotiable instrument, said receipt capable of coordinating said negotiable instrument presented to the merchant with said receipt.

* * * * *